United States Patent [19]
Feindler et al.

[11] 3,820,147
[45] June 25, 1974

[54] BOX-SHAPED STILL CAMERA

[75] Inventors: Ernst Feindler, Laufdorf; Heinz Keiner, Oberndorf, both of Germany

[73] Assignee: Ernt Leitz GmbH, Wetzlar, Germany

[22] Filed: Mar. 8, 1973

[21] Appl. No.: 339,157

[30] Foreign Application Priority Data
Mar. 15, 1972 Germany.......................... 2212475

[52] U.S. Cl. ............................................. 354/288
[51] Int. Cl. .................................... G03b 19/02
[58] Field of Search . 95/11 R, 31 R, 31 AC, 31 FL, 95/31 FM, 31 FS, 34 R, 11.5 R, 44 R, 10 C, 11 V, 64

[56] References Cited
UNITED STATES PATENTS
| | | | |
|---|---|---|---|
| 2,169,548 | 8/1939 | Zapp | 95/31 AC |
| 2,566,267 | 8/1951 | Wallace | 95/34 R |
| 3,687,031 | 8/1972 | Jahsman | 95/11 R |

Primary Examiner—Samuel S. Matthews
Assistant Examiner—Kenneth C. Hutchison
Attorney, Agent, or Firm—Krafft & Wells

[57] ABSTRACT

A box-shaped photographic still camera has a picture taking lens on one narrow side of the camera housing, side by side with the objective lens of the combined view- and rangefinder. The ocular lens of the latter is arranged on the opposite narrow housing side. In the picture taking position the camera is to be held by both hands. A first knob for setting the diaphragm aperture and a second knob for setting the picture taking lens to the object distance are arranged on the lower side of the camera housing. The arrangement is such that in the usual picture taking position the thumb of the one hand in the natural supporting position rests against the first setting knob and the thumb of the other hand rests against the second setting knob. Additionally, the film advance and shutter tensioning member is so arranged on the lower side of the camera housing that it may be actuated by the thumb of one hand by merely moving the thumb from the setting knob to the lever without changing the position of the hand.

5 Claims, 4 Drawing Figures 3,820,147

BOX-SHAPED STILL CAMERA

BACKGROUND OF THE INVENTION

The invention relates to a box-shaped photographic still camera. More particularly the invention relates to a flat camera having the picture taking lens and the view-and rangefinder opening arranged at the narrow sides of the camera housing. Such a camera is usually supported by both hands in the picture taking position in front of the operator's eye.

Cameras of this type are already known in the art and sold on the market. It is however a disadvantage of these cameras that the elements for performing the various adjustments of the camera are located both on the upper and on the lower camera side. With some camera models even the small narrow sides are used for placing such elements.

Such an arrangement of the elements is very unsuitable for a convenient handling of the camera. The operator is forced to hold the camera in his hands in a different position when adjusting the setting members and in the actual picture taking position in front of his eyes. When taking the camera from this eyes he must release the grip of his hands and change his hand position on the camera housing in order to reach the setting members for adjusting the camera to other shooting conditions. This is most inconvenient and prevents the operator from working fast with such a camera.

It is, therefore, the object of the present invention to provide a box-shaped still camera of the above described type where the setting members are purposely arranged for convenient operation. It is a particular object to provide a camera which is supported in the hands of the operator in the same position when adjusting the setting elements and when shooting a picture.

SUMMARY OF THE INVENTION

The above stated objects are attained by so arranging a first knob for setting the diaphragm aperture and a second knob for adjusting the picture taking lens to the object distance on the lower side of the camera housing that in the usual picture taking position of the camera in front of the operator's eye the thumb of the one hand in the natural supporting position rests against the first setting knob and the thumb of the other hand rests against the second setting knob. Further, the film advance and shutter tensioning member is also arranged on the lower camera side at a place which the operator can reach with one thumb by changing the position of the thumb only, without altering the grip of his hand.

A particularly convenient arrangement is attained if the scales of the f-stop values and the distance scale are provided on the setting knobs respectively and a first and a second index mark are provided by the knobs in the rear of the camera; by the term "rear" is meant the direction towards the operator while "front" means the direction towards the object to be photographed; both in the normal picture taking position of the camera. The scales may then very easily be read after a natural tilting motion of the hands and arms.

A further particularly suitable arrangement is obtained if one of the two setting knobs on the lower camera side is so arranged that the direction of movement of the shutter release rod on the upper side of the camera passes substantially through the thumb which rests against the knob. The thumb will then absorb the impact of the release movement so that the danger of moving the camera during the exposure is greatly reduced.

When a camera is to be provided with a tripod socket it is suggested that the socket be arranged on the upper side of the camera housing. In a screwed-on state the lower side will then point upwards so that the setting knobs are readily accessible. Further, a cable release threaded into the release socket will hang downwards so that there will be no danger of buckling.

BRIEF DESCRIPTION OF THE DRAWINGS

The invention will be more readily comprehended from the following description when taken in conjunction with the appending drawings, wherein.

DESCRIPTION OF THE PREFERRED EMBODIMENT

Figure 1:
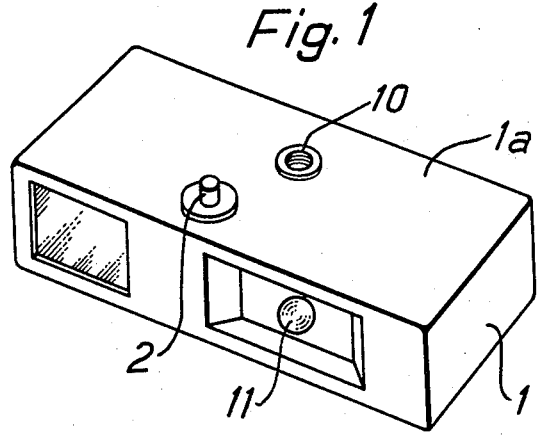
FIG. 1 is a perspective view of the camera displaying the upper camera side.

Referring now to the drawings the camera 1 comprises on its upper side 1a a release button 2 which is the only operating element on this side. On the lower side 1b (FIG. 2) there is provided a first setting knob 3 for adjusting the diaphragm and a second setting knob 4 for adjusting the position of the picture taking lens 11 to the object distance. A slide 5 is also provided which must be actuated for the film transport and shutter tensioning operation.

The first and second setting knob each have a scale, designated 3a and 4a respectively, and the corresponding index marks are engraved in the camera body. The knobs are arranged substantially symmetrical to the middle of the camera and closer to the rear narrow side 6 of the camera. On the surface in front of the knobs the thumbs of the two hands may be placed conveniently and may be brought into contact with the circumference of the setting knobs, as illustrated in FIG. 2.

Figure 3:
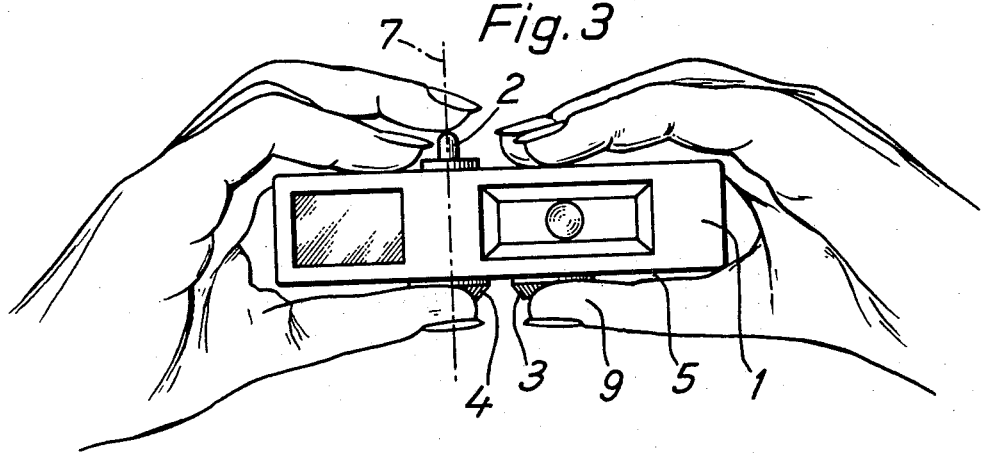
FIG. 3 is a front view of the camera held in the two hands of the operator.

The normal picture taking position of the camera may best be seen from FIG. 3. In this position the camera is held between the fingers of the two hands with the thumbs resting conveniently against the setting knobs. Particularly from FIG. 3 it will be readily recognized that the arrangement of the shutter release button 2 is such that its direction of movement, indicated by the dash-dotted line 7, passes through the thumb of one hand. The thumb thus provides a counter force which balances the pushing movement of the release knob.

Figure 4:
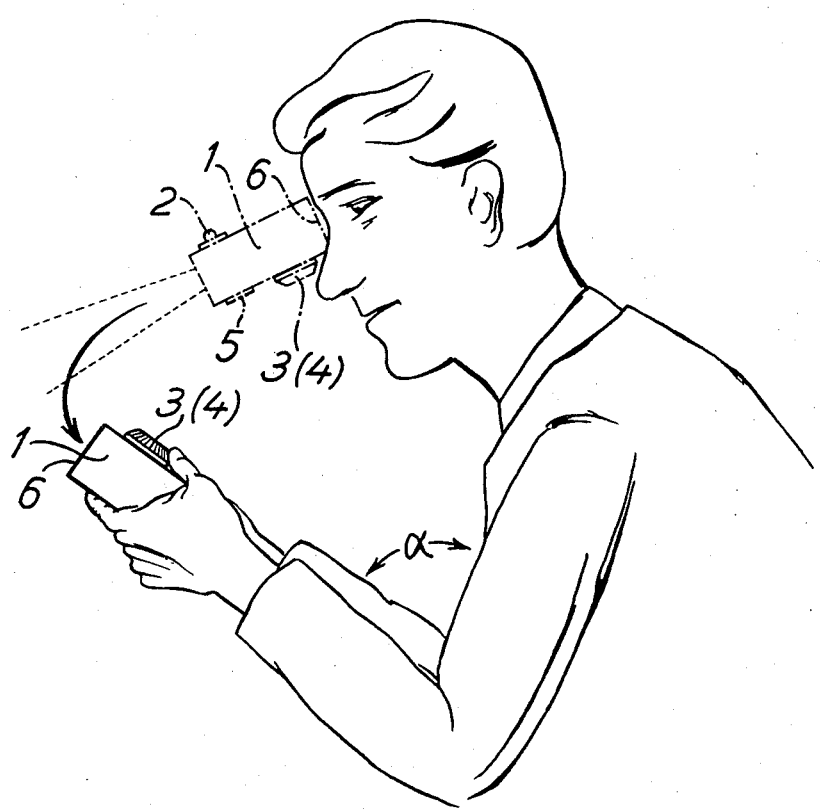
FIG. 4 illustrates the easy manner in which the scales may be read when the camera is taken from the eye.

From FIG. 4 it will be understood that the scales may conveniently be read when the camera is taken from the eye by a natural tilting movement of the arms through an angle $\alpha$.

Figure 2:
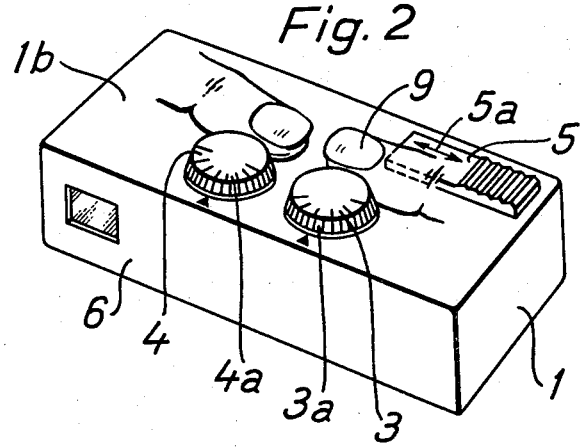
FIG. 2 is a perspective view of the camera displaying the lower camera side.

FIG. 1 also shows the tripod socket 10 provided on the upper side 1a of the camera; and from FIG. 2 it will be seen that the arrangement of the slide 5 is such that the slide may conveniently be reached by the thumb 9 for actuation without changing the grip of the hand. transporting the film and tensioning the shutter is accomplished by pushing the slide 5 in the direction of the double-headed arrow 5a against the force of a spring.

What is claimed is:

1. A box-shaped still camera, comprising:
   a camera housing having a substantially flat front narrow side, a substantially flat narrow rear side opposite said front narrow side, a substantially flat upper side and a substantially flat lower side, said front and rear sides having a width less than said upper and lower sides,
   an objective lens of a combined view and range finder located on one side of said front narrow side, said objective lens having an objective axis extending through said housing, an ocular lens located on said rear narrow side along said objective axis,
   a picture taking lens located on the other side of said front narrow side and side-by-side with said objective lens,
   a shutter release button on said upper side,
   a first setting knob for regulating the diaphragm aperture mounted forward on said lower side, and
   a second knob for adjusting the position of the picture taking lens to the object distance mounted forward on said lower side and side-by-side with said first setting knob whereby the right hand thumb and the left hand thumb of an operator rest conveniently against the circumference of said first and second setting knobs when the camera is in its normal shooting position.

2. The box-shaped still camera of claim 1, further comprising a film transport and shutter tensioning member arranged on said lower side in proximity to one of said setting knobs whereby said member may be reached by changing the position of one thumb without altering the position of the other thumb.

3. The box-shaped still camera of claim 1, further comprising a first scale on said first setting knob and a second scale on said second setting knob, and a first index mark and a second index mark located adjacent said first and second scales respectively, said index marks positioned forward on said upper side adjacent said front side whereby said scales and index marks are read conveniently when said camera is removed from its normal picture taking position in front of an operator's eye by a tilting movement of the oeprator's arms.

4. The box-shaped still camera of claim 1, wherein said camera housing has a right side wall and a left side wall, said shutter release button has a vertical axis perpendicular to said upper side, said second setting knob has an axis of rotation perpendicular to said lower side, said axis of rotation spaced at a given distance from said right side wall and said vertical axis spaced at less than said given distance from said right side wall whereby said vertical axis passes through the thumb of the operator resting against said second setting knob.

5. The box-shaped still camera of claim 1, further comprising a tripod socket arranged on said upper side.

* * * * *